W. S. RUGGLES.
Cooking Stove.
No. 20,304.
Patented May 18, 1858.
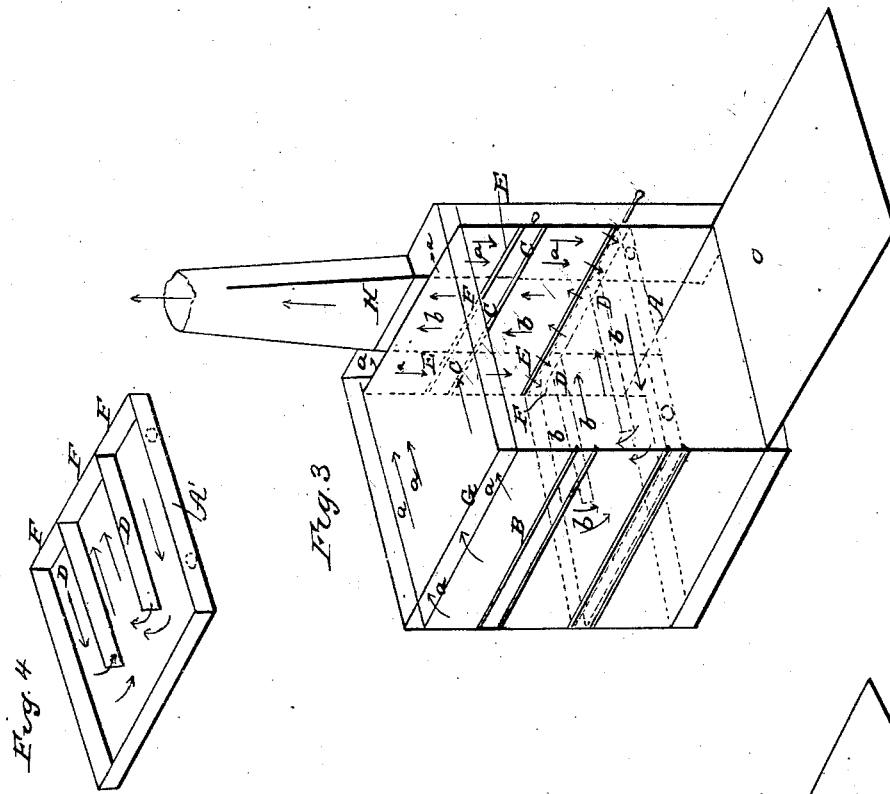
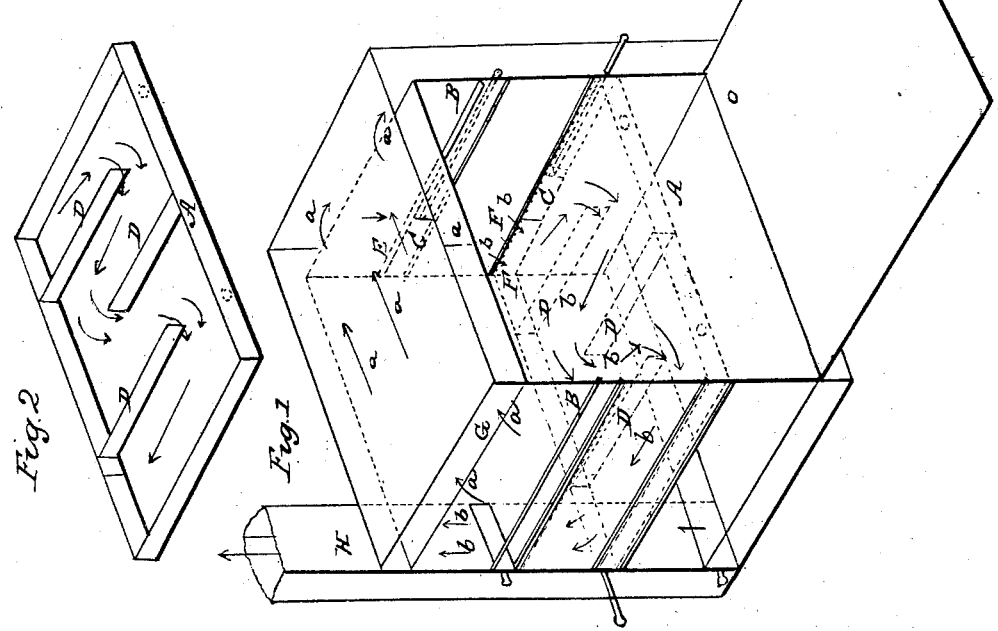

UNITED STATES PATENT OFFICE.

W. G. RUGGLES, OF WORCESTER, MASSACHUSETTS.

APPARATUS FOR BAKING AND COOKING.

Specification of Letters Patent No. 20,304, dated May 18, 1858.

*To all whom it may concern:*

Be it known that I, WILLARD G. RUGGLES, of the city and county of Worcester and State of Massachusetts, have invented certain new and useful Improvements in Apparatus for Baking and Heating; and I do hereby declare that the following is a full and exact description thereof, reference being had to the accompanying drawings and to the letters of reference marked thereon.

The main feature of my improvement consists of a movable flue, properly divided by partitions so as to cause the heated air &c. from the fire to circulate thoroughly in all its parts; one or more of these flues are placed in the oven of the stove, cooking range or baker as the case may be, (it being equally applicable to all these) for the purpose of dividing the oven into smaller compartments, one or more of which may be heated according to the quantity of material to be cooked, for if a quantity of pastry or crackers, or other things requiring but little room in height is to be baked these flues afford a great increase of baking surface, making as it were a series of small ovens of the large one, each of which will be properly heated both top and bottom the desired amount of heat being regulated to each flue by means of the slides at the back which open and close the apertures through which the heated air &c. is admitted to the flues, at the same time by removing the flues and closing the slides the same oven may be used to cook meat and other large edible substances; by inserting the upper flue alone and directing the draft through it to the exclusion of the other flues a small oven may be formed for the lesser operations in baking, which may be used with great saving both in fuel and time over the large one, and throwing out far less heat into the apartment, which in summer is an important consideration. The next most important feature is the arrangement of the slides for closing the entrances to the several flues, when the oven is to be used without them, and for the purpose of allowing the flues a proper amount of the draft.

In the accompanying drawings Figure 1 represents the oven of a cooking range with two of flues applied one being in place A and the other removed A'; Fig. 2 shows the flue removed from No. 1 (with the top plate removed to show inside); Fig. 3 represents a cooking stove oven with two flues applied one in place A the other removed; Fig. 4 shows the flue removed from No. 3.

To construct the improvement make a box A' of either cast or sheet metal of from ½ inch to two inches deep or more, according to the size of the oven to which it is to be applied, and about as wide and long as that part of the oven that is to receive it. This box or flue A, A', is to be furnished with partitions D which may be varied in making the flue as may be found best calculated to spread the heated current to every part of the flue in one side of the oven are formed openings E, furnished with slides or gates C to close them. These openings agree with openings F left in the sides of the flues. (See Figs. 2 and 4.)

G represents the opening between the top of the stove and top of the oven where the heated air &c. from the fire enters and passes in the direction of the arrows $a, a$, until it reaches the openings to the flues F when, the slides C being open it follows the direction indicated by the arrows $b, b$, through the flue and into the passage H leading to the pipe or chimney.

The sides of the oven are furnished with suitable projections (seen at B where the flue is removed) to support the flue when in use. These flues whether more or less in number do not use the current of heat in succession, but each one receives its own share direct from the main passage, which makes it much easier to maintain an equal heat in all of them.

I do not confine myself to any particular number of flues for an oven, but use as many as may be desired.

My arrangement by affording more heating surface increases the capacity of the stove for warming the room in cold weather by leaving the oven door O open.

What I claim as my invention and desire to secure by Letters Patent is—

I claim—

The arrangement of the flue or flues with the slides and openings when constructed as described.

In testimony whereof I hereunto set my hand in the presence of two witnesses.

WILLARD G. RUGGLES.

Witnesses:
FRANCIS W. HIGGINS,
BENJAMIN ARNOLD.